Nov. 9, 1965        D. DOMINA        3,216,761
TRACTOR ROOF AND WINDSHIELD
Filed March 8, 1963        2 Sheets-Sheet 1
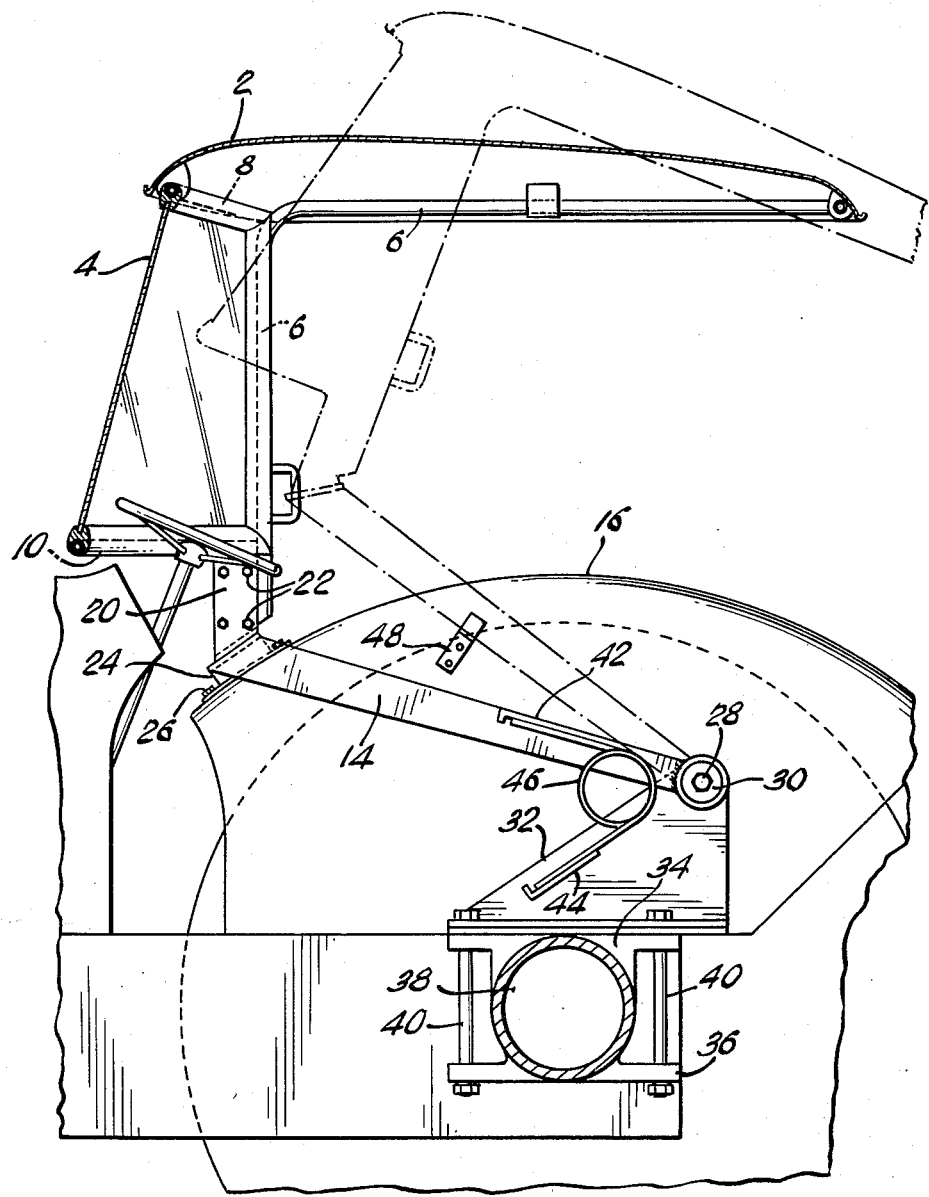
INVENTOR.
DELFRIED DOMINA
BY *Flynn, Mann &*
*Jangarathis*
ATTORNEY

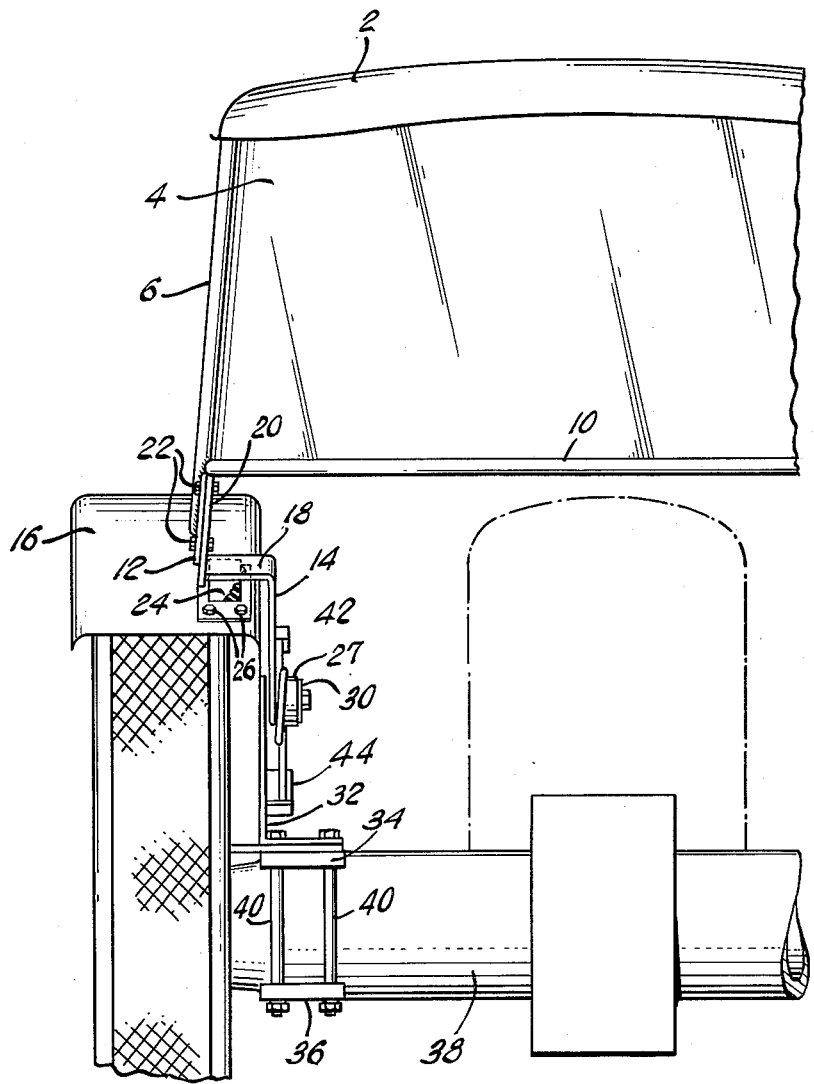

United States Patent Office 3,216,761
Patented Nov. 9, 1965

3,216,761
TRACTOR ROOF AND WINDSHIELD
Delfried Domina, Ingolstadt, Germany, assignor to Georg Fritzmeir, Munich, Germany, a limited partnership
Filed Mar. 8, 1963, Ser. No. 263,981
2 Claims. (Cl. 296—102)

This invention relates to a tractor roof and windshield assembly.

Previously, such assemblies were supported by the fenders of a tractor and seated on springs positioned on the fenders so as to dampen the stress of the assembly on the fender as a result of the shock received by the vehicle in motion. Further, windshields have been rotatably mounted on a horizontally positioned axis member mounted on two vertical supports, and can be rotated to an open position to permit the driver of the vehicle to enter from the front.

It is an object of my invention to provide a novel roof and windshield assembly which is easily mounted on a tractor.

Another object of my invention is to provide a novel tractor roof and windshield assembly which may be easily raised and lowered to permit ingress and egress of the driver of the tractor.

A further object of my invention is to provide a novel tractor roof and windshield assembly which is primarily supported by the rear axle of the tractor instead of the fenders of the tractor.

Further objects and a fuller understanding of my invention may be had by referring to the following description taken in conjunction with the accompanying drawings, in which:

FIGURE 1 is a partial side view of the tractor roof and windshield assembly in closed position, and FIGURE 2 is a partial front view of the roof and windshield assembly.

In accordance with my invention, a tractor roof and windshield assembly is supported by and rigidly affixed to pivotal arms or supports. Accordingly, the ends of the pivotal arms, opposite the ends upon which the assembly is mounted, are preferably positioned above the rear axle of the tractor and are suitably mounted on bearing means permitting the pivotal arms and assembly to be upwardly rotated to a position permitting ingress to the tractor proper from the front of the tractor.

The roof and windshield assembly is affixed to the pivotal arms at the lower portion of the assembly, preferably at the lower edge of the windshield. The assembly in a lowered position rests on resilient means which may be attached to the fenders in a manner permitting the pivotal arms to rest on such resilient means. Resilient means may alternately be attached to the hood of the tractor, in which event a tubular member forming a lower part of the windshield frame rests on the resilient means. Spring means are provided to facilitate the raising of the assembly, as well as to soften the impact of the assembly when lowering the same to a closed position.

Referring now to the drawings, wherein like numerals indicate like parts throughout, the roof and windshield assembly is comprised of a roof proper 2 and a windshield 4 which are secured to perpendicularly-shaped frames 6 having horizontally positioned tubes 8 and 10 mounted thereon, and include pivotable support means, as more fully hereinafter described, to form an integral unit. The tubes 8 and 10 are transversely positioned and border the windshield at the top and lower portion thereof, respectively. A plate 12 is rigidly affixed to the frame 6 at the lower portion thereof below the intersection of the frame 6 and the tube 10.

The roof and windshield assembly is mounted on pivotal arms or supports 14 formed of sheet metal and shaped to follow the contours of the inner surface of the fenders 16 of the tractor. The pivotal arms 14 are essentially horizontal when the assembly is in a closed position. One end of each of the pivotal arms 14 is obliquely bent and forms an end member 18 upon which an intermediate connecting plate 20 is rigidly affixed thereto. The intermediate plate 20 of each of the pivotal arms 14 is secured to the plate 12 of the frame 6 by suitable means, such as bolts 22 thereby rigidly affixing the assembly to the pivotal arms 14.

Resilient means assembly 24 is mounted on and affixed to the tractor fender 16 by suitable means, such as bolts 26. The end member 18 of the pivotal arms 14 rests on the resilient means of the assembly 24 which partially supports and cushions the roof and windshield assembly when the assembly is in a closed position. The plate 20 is mounted on the pivotal arms 14 in a manner so as to prevent the assembly from slipping inwardly towards the cab portion of the tractor.

The ends of the arms 14, opposite the end upon which the assembly is mounted, are formed of circular end member 27. The axis 28 of each of end members 27 of the pivotal arms 14 are coaxially aligned and seated in suitable bearing means 30 mounted on an L-shaped plate 32. The pivotal arms 14 are positioned diagonally forward and upward from the axis 28 to the end member 18 to absorb the shocks which are generally transmitted vertically downward. Each L-shaped plate 32 is affixed to a fender support means comprised of U-shaped brackets 34 and 36 mounted on the rear axle 38 and on either side of the differential of the tractor, and fastened to the fender support means by suitable means, such as threaded bolts 40.

Rigidly affixed to pivotal arms 14 and the plate 32 and adapted to restrain the arm-like end portions of a helical spring are L-shaped members 42 and 44, respectively. A helical spring 46 is positioned between the pivotal arms 14 and the plate 32 with the arm-like end portions of which engage and press against the surfaces of the L-shaped members 42 and 44 to partially cushion the impact of the assembly when lowering the assembly to a closed position, and to partially support the weight of the assembly. The primary function of the helical spring 46, however, is to facilitate the raising and lowering of the roof and windshield assembly.

Positioned on and affixed to one of the fenders 16 is a springing blade 48 which forms a self-contained arresting mechanism. The blade 48 prevents the pivotal arms 14 from being lowered to a completely closed position as shown by the dotted lines. When closing the assembly, the blade 48 must be bent towards the fender 16 to allow the assembly to be lowered to the closed position. Upon raising the assembly, the blade 48 is bent towards the fender 16 by the pivotal arms 14 and returns to its normal position after the arm 14 has traversed the blade.

The roof and windshield assembly may be mounted to pivotal arms 14 at the rear of the roof proper. In such event, resilient means of the assembly 24 would be mounted on the hood of the tractor.

While I have shown and described a preferred embodiment of my invention, I am aware that variations may be made thereto and I, therefore, desire a broad interpretation of my invention within the scope of the disclosure herein and the following claims.

I claim:

1. A roof and windshield assembly attachable to a tractor or similar vehicle, comprising roof and windshield members forming a unitary arrangement, elongated support means extending along the inner surface of the fenders of said vehicle and including an outwardly-shaped extension member, said arrangement being fixedly attached to said extension member near said windshield member, bracket means mounted on the rear axle of said vehicle on either side of said differential thereof, pivotable supports mounted on said bracket means attached pivotably to said elongated support means at a position to the rear of said windshield member, said arrangement and said elongated support means being disposed to enable ingress and egress from the front of the tractor upon upward pivotable motion thereof, and a resilient means mounted on the fenders of said vehicle and upon which said extension members of said support means rest when the assembly is in a lowered position.

2. A roof and windshield assembly attachable to a tractor or a similar vehicle, comprising roof and windshield members forming a unitary arrangement, elongated support means extending along the inner surface of the fenders of said vehicle and including an outwardly-shaped extension member, said arrangement being fixedly attached to said extension member near said windshield member, bracket means mounted on the rear axle of said vehicle on either side of said differential thereof, pivotable supports mounted on said bracket means and attached pivotably to said elongated support means at a position to the rear of said windshield member, said arrangement and said elongated support means being disposed to enable ingress and egress from the front of the tractor upon upward pivotable motion thereof, and an arresting means mounted on a fender of said vehicle, said arresting means holding said assembly in a partially open position.

References Cited by the Examiner
UNITED STATES PATENTS

| | | | |
|---|---|---|---|
| 2,565,919 | 8/51 | Hill | 296—102 |
| 2,740,487 | 4/56 | Murty et al. | 180—89 |
| 2,774,610 | 12/56 | Ratcliffe | 280—512 |
| 3,051,259 | 8/62 | Lorene | 180—89 |

A. HARRY LEVY, *Primary Examiner.*